United States Patent
Kim et al.

(10) Patent No.: US 12,503,172 B2
(45) Date of Patent: Dec. 23, 2025

(54) SIDE REINFORCEMENT STRUCTURE OF VEHICLE

(71) Applicants: Hyundai Motor Company, Seoul (KR); Kia Corporation, Seoul (KR)

(72) Inventors: Byung-Jo Kim, Gwangmyeong-si (KR); Seung-Gu Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 399 days.

(21) Appl. No.: 18/192,309

(22) Filed: Mar. 29, 2023

(65) Prior Publication Data
US 2024/0043070 A1 Feb. 8, 2024

(30) Foreign Application Priority Data
Aug. 3, 2022 (KR) .................. 10-2022-0096932

(51) Int. Cl.
*B62D 25/20* (2006.01)
*B62D 21/15* (2006.01)
*B62D 25/02* (2006.01)

(52) U.S. Cl.
CPC ......... *B62D 25/2036* (2013.01); *B62D 21/15* (2013.01); *B62D 25/025* (2013.01)

(58) Field of Classification Search
CPC ... B62D 25/2036; B62D 21/15; B62D 25/025
See application file for complete search history.

(56) References Cited

U.S. PATENT DOCUMENTS

| | | | | |
|---|---|---|---|---|
| 5,352,011 A | * | 10/1994 | Kihara ................ | B62D 25/06 296/203.03 |
| 2004/0113462 A1 | * | 6/2004 | Winter ................ | B62D 25/08 296/203.02 |
| 2012/0248825 A1 | * | 10/2012 | Tamura ............... | B62D 25/025 296/209 |
| 2019/0016392 A1 | * | 1/2019 | Lee ..................... | B62D 25/04 |
| 2020/0398899 A1 | * | 12/2020 | Yamazaki ........... | B62D 25/025 |
| 2021/0380173 A1 | * | 12/2021 | Kim .................... | B62D 25/025 |
| 2023/0312020 A1 | * | 10/2023 | Muramatsu ......... | B62D 25/025 296/204 |
| 2025/0128767 A1 | * | 4/2025 | Abe .................... | B62D 27/023 |

FOREIGN PATENT DOCUMENTS

KR    20030016642 A    3/2003

* cited by examiner

*Primary Examiner* — Taras P Bemko
(74) *Attorney, Agent, or Firm* — SLATER MATSIL, LLP

(57) ABSTRACT

An embodiment side reinforcement structure includes a first bracket coupled to a side sill and a second bracket inserted into and connected to a first side of the first bracket and coupled to a chassis frame. An embodiment vehicle includes a vehicle body including a chassis frame, a center pillar, a side sill, and floor lower member connected to the side sill and a side reinforcement structure including a first bracket coupled to the side sill and a second bracket inserted into and connected to a first side of the first bracket and coupled to the chassis frame.

18 Claims, 7 Drawing Sheets

SIDE REINFORCEMENT STRUCTURE OF VEHICLE

CROSS-REFERENCE TO RELATED APPLICATIONS

This application claims the benefit of Korean Patent Application No. 10-2022-0096932, filed on Aug. 3, 2022, which application is hereby incorporated herein by reference.

TECHNICAL FIELD

The present disclosure relates to a side structure of a vehicle.

BACKGROUND

In order to protect a passenger or a pedestrian in the event of an accident of a vehicle, standards for vehicle safety are increasingly strengthened.

As one method for reducing the injury of the passenger when a collision occurs, there is a method of reducing the deformation amount of an interior of the vehicle in which the passenger rides.

As illustrated in FIG. 1, in the frame body vehicle, the vehicle body is connected to a chassis frame 110. For example, the floor panel 121 is connected to the chassis frame 110 using a bush 122. The frame body vehicle has an advantage that an interior space of the vehicle is not deformed since the chassis frame no supports a load input when the vehicle collides in a longitudinal direction, that is, when a front collision or a rear collision occurs.

However, the frame body vehicle has a disadvantage in a side collision. For example, as illustrated in FIG. 2, when collision energy F is applied to a side of the vehicle during a side collision of the vehicle, the side sill 124 is deformed to rotate around a virtual axis perpendicular to the ground. Due to the rotational deformation of the side sill 124, a center pillar 125 invades into the interior of the vehicle (refer to the dotted line of FIG. 2). When the center pillar 125 invades into the interior side of the vehicle, the survival space of the passenger is reduced, thereby causing injury to the passenger.

Meanwhile, in recent years, as the evaluation criteria for side collisions are increased, a load and a speed of the barrier colliding with the vehicle are increasing. Accordingly, as the deformation of the side sill 124 increases during a side collision evaluation, the amount of the center pillar 125 invading into the interior of the vehicle increases.

It is important to reduce the amount of the center pillar 125 invading into the interior of the vehicle in order to reduce injury to the passenger when a side collision occurs as well as a side collision evaluation.

SUMMARY

The present disclosure relates to a side structure of a vehicle. Particular embodiments relate to a side reinforcement structure of a vehicle in which rotational deformation of a side sill is prevented so that a center pillar is not pushed into an interior of the vehicle when a side collision occurs.

Embodiments of the present disclosure can solve problems in the art, and an embodiment of the present disclosure provides a side reinforcement structure of a vehicle, in the frame body vehicle, a side sill and a center pillar are directly connected to each other, and energy of a side collision is transmitted to a chassis frame of the vehicle, thereby preventing rotation of the side sill and preventing the side sill from entering an interior of a vehicle.

A side reinforcing structure of a vehicle according to embodiments of the present disclosure includes a first bracket coupled to a side sill and a second bracket which is inserted and connected to one side of the first bracket and coupled to a chassis frame.

As an exemplary embodiment, when a side collision of a vehicle occurs, the first bracket is restricted not to be spaced apart from the second bracket, so as to prevent the side sill from rotating with respect to a virtual axis perpendicular to the ground.

As an exemplary embodiment, the first bracket includes a connection unit configured to connect to the second bracket, the second bracket has a coupling groove into which the connection unit is inserted, and the connection unit is restricted to the coupling groove during a side collision.

As an exemplary embodiment, an end portion of the connection unit inserted into the coupling groove is formed in a T-shape, and the coupling groove is formed to a predetermined depth from an upper end of the second bracket to constrain the end portion of the connection unit.

As an exemplary embodiment, the first bracket includes a first body, a first flange portion formed around the first body and coupled to the side sill, and the connection unit extending from the first body toward the coupling groove.

As an exemplary embodiment, the first bracket is positioned at a portion where a floor lower member is connected to the side sill, and the first flange unit is coupled to the side sill and the floor lower member.

As an exemplary embodiment, the second bracket includes a second body, a second flange unit formed around the second body and coupled to the chassis frame, and the coupling groove formed at a predetermined depth from an upper end of the second body on a surface facing the side sill in the second body.

As an exemplary embodiment, a support surface for supporting an end portion of the connection unit is formed around the coupling groove in the second body.

As an exemplary embodiment, the first bracket and the second bracket are formed within a predetermined length in the longitudinal direction of a vehicle from a position where a center pillar is formed.

As an exemplary embodiment, the second bracket further includes a deformation guide bead formed to be concave or convex in a longitudinal direction of a vehicle in the second body.

As an exemplary embodiment, the first bracket is coupled to the side sill by spot welding, and the second bracket is coupled to the chassis frame by $CO_2$ welding.

As an exemplary embodiment, when a collision occurs on the side of a vehicle, the side sill and the first bracket are pushed toward an interior of the vehicle and the second bracket is deformed to absorb collision energy.

As an exemplary embodiment, according to the side reinforcement structure of a vehicle having the above configuration, the side sill and the chassis frame are connected through the first bracket and the second bracket, therefore side collision performance of the frame body vehicle is improved.

As an exemplary embodiment, since the side sill and the center pillar are connected to each other through the first bracket and the second bracket, collision energy may be transferred to the chassis frame as the second bracket is deformed and absorbed.

As an exemplary embodiment, in addition, since the first bracket and the second bracket are connected to each other to restrain the side sill from being rotated by collision energy, the center pillar reduces the amount of invasion into the interior of the vehicle due to deformation of the side sill. Accordingly, the amount of a reduced interior space of the vehicle is also reduced, thereby reducing injury to the passenger.

DETAILED DESCRIPTION OF ILLUSTRATIVE EMBODIMENTS

Figure 1:
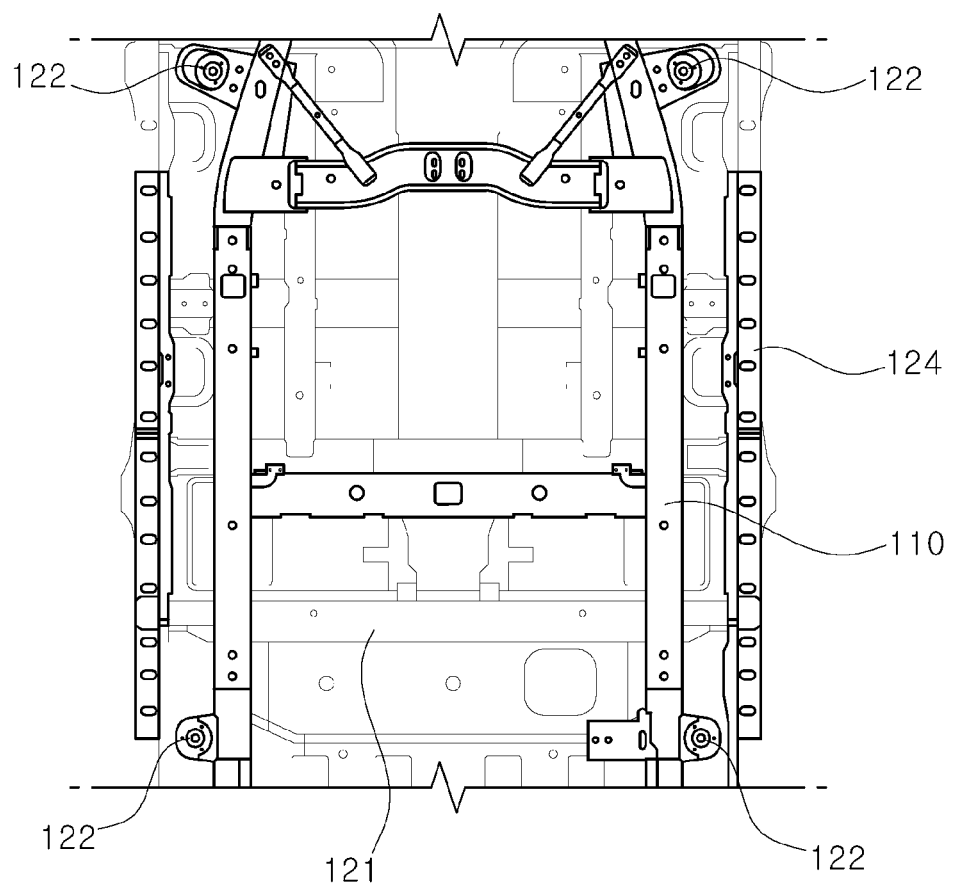
FIG. 1 is a bottom view of a vehicle illustrating a state in which a chassis frame and a floor panel are connected in a frame body vehicle.
Figure 2:
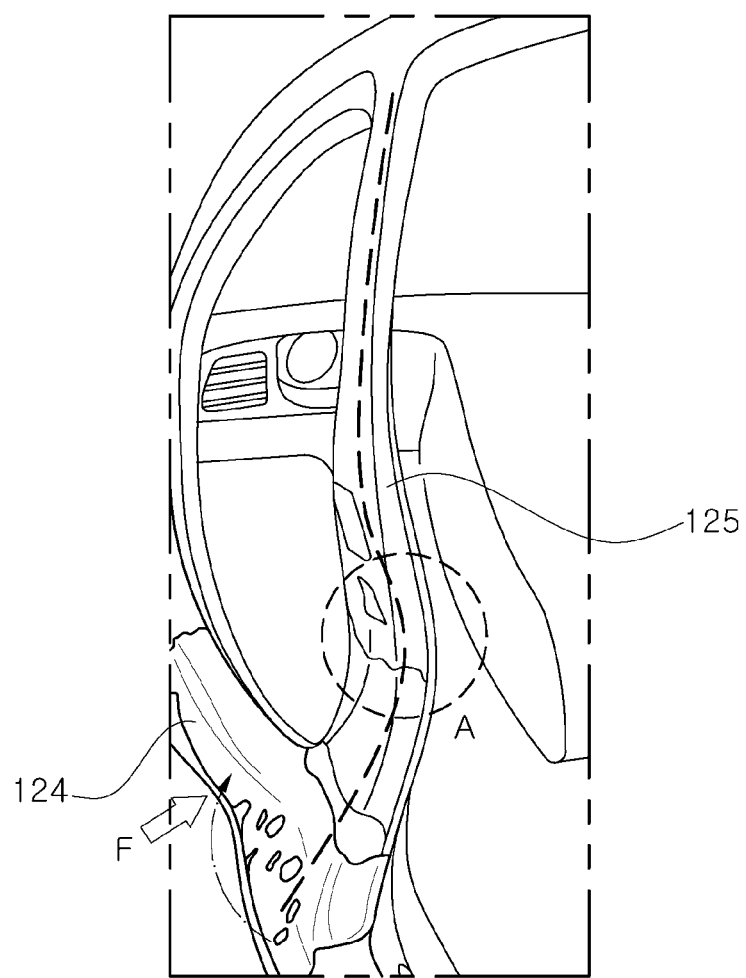
FIG. 2 is a perspective view illustrating a state where a side sill and a center pillar are deformed by a side collision in a vehicle to which a side structure according to the related art is applied.

Hereinafter, a side reinforcement structure of a vehicle according to embodiments of the present disclosure will be described in detail with reference to the accompanying drawings.

The side reinforcement structure of a vehicle according to embodiments of the present disclosure includes a first bracket 30 coupled to a side sill 24 to face a chassis frame 10 and a second bracket 40 connected to the first bracket 30 and coupled to the chassis frame 10. When a collision occurs in a side surface of the vehicle, the first bracket 30 is restricted not to be spaced apart from the second bracket 40, thereby preventing the side sill 24 from rotating with respect to a virtual axis perpendicular to the ground, and the side sill 24 and the first bracket 30 are pushed toward the interior of the vehicle and the second bracket 40 is deformed to absorb collision energy.

The side sill 24 and the chassis frame 10 are directly connected to each other in a frame body vehicle of embodiments of the present disclosure, thereby preventing rotation deformation of the side sill 24 during a side collision and thus restraining the center pillar from invading the interior of the vehicle.

To this end, the first bracket 30 and the second bracket 40 are provided to connect the side sill 24 and the chassis frame 10. The first bracket 30 is coupled to the side sill 24, the second bracket 40 is coupled to the chassis frame 10, and the first bracket 30 and the second bracket 40 are connected to each other, so that the side sill 24 and the chassis frame 10 are connected.

The first bracket 30 and the second bracket 40 are coupled to the side sill 24 and the chassis frame 10, respectively, at a position to which the center pillar is adjacent. The side sill 24 and the chassis frame 10 are directly connected to each other through the first bracket 30 and the second bracket 40 within a predetermined length along a longitudinal direction T of the vehicle from a position where the center pillar is formed, thereby improving collision performance during a side collision.

The first bracket 30 includes a first body 31, a first flange unit 32 formed around the first body 31 and coupled to the side sill 24, and a connection unit 33 which is formed to face the chassis frame 10 from the first body 31 and connected to the second bracket 40.

The first body 31 forms a basic shape of the first bracket 30.

The first flange unit 32 is formed around the first body 31. The first flange unit 32 is in surface contact with the side sill 24, and the first flange unit 32 is coupled to the side sill 24, so that the first bracket 30 is coupled to the side sill 24. When the first bracket 30 is applied to a portion where the side sill 24 and the floor lower member 23 contact each other, the first flange unit 32 is formed to contact both the side sill 24 and the floor lower member 23. When the first bracket 30 is bonded to the side sill 24 and the floor panel, respectively, the first flange unit 32 is formed to contact the side sill 24 and the floor panel.

The connection unit 33 is formed to extend from the first body 31 toward the second bracket 40. The end portion of the connection unit 33 is formed in a T-shape to have a width greater than the width of a coupling groove 43 to be described below, and thus the connection unit 33 is maintained in a connected state without being separated from the second bracket 40. Accordingly, the first bracket 30 is restricted not to be spaced apart from the second bracket 40, thereby preventing the side sill 24 from rotating with respect to a virtual axis perpendicular to the ground.

The first bracket 30 is bonded to the side sill 24 by spot welding. In a state in which the first flange unit 32 is in surface contact with the side sill, the first bracket 30 is coupled to the side sill 24 through spot welding to the first flange unit 32 and the side sill 24.

Meanwhile, the first bracket 30 may be bonded only to the side sill 24, but preferably, the first bracket 30 is bonded to the side sill 24 and the floor lower member 23, respectively, at a portion where the side sill 24 and the floor lower member 23 are bonded to each other. Alternatively, the first bracket 30 may be bonded to the side sill 24 and the floor panel, respectively.

The second bracket 40 includes a second body 41, a second flange unit 42 formed around the second body 41, which is coupled to the chassis frame 10, a coupling groove 43 formed on a surface of the second body 41 at a predetermined depth from an upper end of the second body 41 facing the side sill 24, and a deformation guide bead 45 for inducing deformation of the second bracket 40 during a side collision.

The second body 41 forms a basic shape of the second bracket 40.

The second flange unit 42 is formed around the second body 41 so that the second bracket 40 is in surface contact with the side surface of the chassis frame 10. The second flange unit 42 may be bonded to the chassis frame 10, and thus the second bracket 40 may be coupled to the chassis frame 10.

The coupling groove 43 is formed on a surface facing the first bracket 30 from the second body 41. The coupling groove 43 is formed at a predetermined depth downward from an upper end of the second body 41. Since the coupling groove 43 is formed in the height direction H of the vehicle, the end portion of the connection unit 33 is inserted through an upper end of the coupling groove 43. Since the end portion of the connection unit 33 is formed in a T-shape, the end portion of the connection unit 33 is inserted into the coupling groove 43 and is restricted. Accordingly, the first bracket 30 and the second bracket 40 have a structure which is connected without being separated from each other.

In the second body 41, the circumference of the coupling groove 43 becomes a support surface 44 supporting the end portion of the connection unit 33. The support surface 44 is formed in a plane around the coupling groove 43, and thus the end portion of the connection unit 33 may be supported by the support surface 44.

In particular, the second bracket 40 is formed with a deformation guide bead 45 whose cross section rapidly changes in a width direction L of the vehicle. The deformation guide bead 45 is formed in a corrugated shape by rapidly changing a cross section in the width direction L of the vehicle. As the deformation guide bead 45 is formed in a concave or convex shape in a longitudinal direction T of the vehicle, when the side sill 24 and the first bracket 30 are pushed toward the interior of the vehicle in a side collision, the second bracket 40 is deformed around the deformation guide bead 45 to absorb a portion of the collision energy. It is preferable that the deformation guide bead 45 be formed to be concaved toward the inside of the second body 41 on a surface perpendicular to the chassis frame 10.

The second bracket 40 is coupled to the chassis frame 10 by welding. In a state where the second flange unit 42 is disposed to be in contact with the surface from the chassis frame 10 toward the side sill 24, the second bracket 40 is coupled to the chassis frame 10 as the periphery of the second flange unit 42 is bonded to the chassis frame 10 through $CO_2$ welding.

Figure 3:
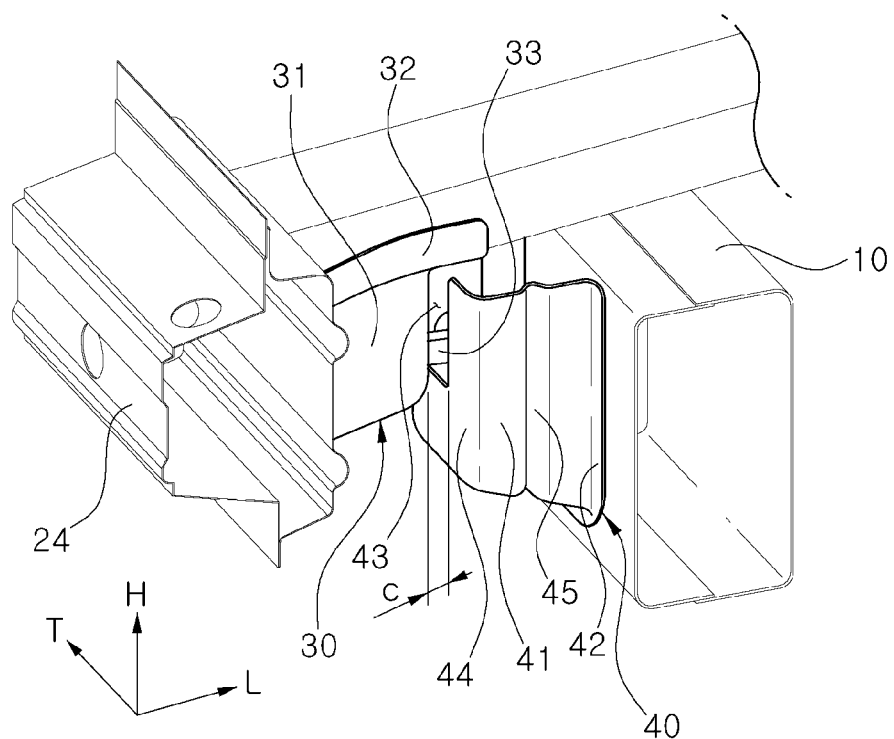
FIG. 3 is a perspective view illustrating a side reinforcement structure of a vehicle according to embodiments of the present disclosure.
Figure 4:
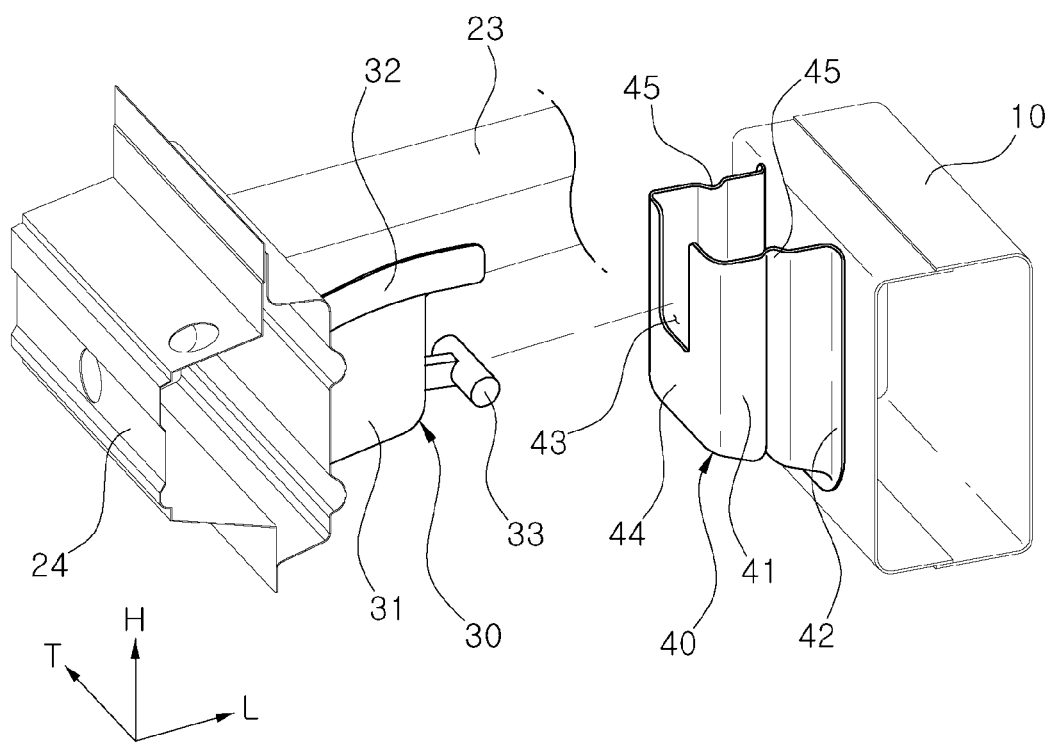
FIG. 4 is an exploded perspective view illustrating the side reinforcement structure of a vehicle according to embodiments of the present disclosure.
Figure 5:
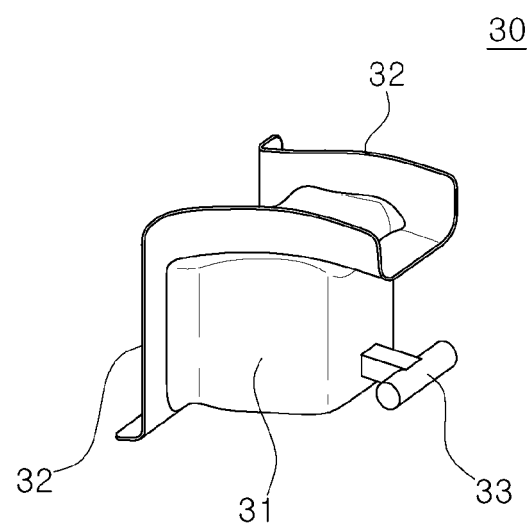
FIG. 5 is a perspective view of a first bracket applied to the side reinforcement structure of a vehicle according to embodiments of the present disclosure.
Figure 6:
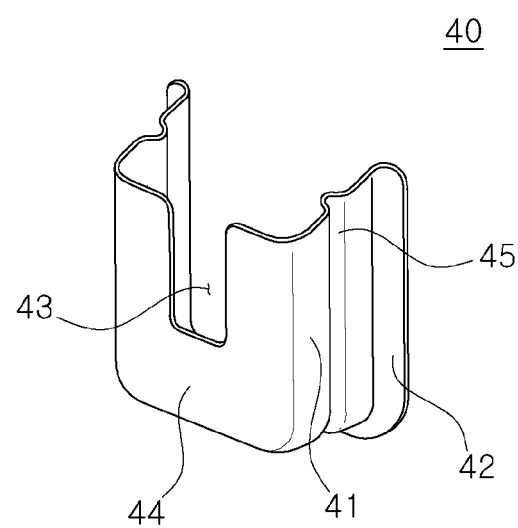
FIG. 6 is a perspective view of a second bracket applied to the side reinforcement structure of a vehicle according to embodiments of the present disclosure.

The first bracket 30 and the second bracket 40 allow a gap c to be formed therebetween when the vehicle is manufactured. That is, as illustrated in FIG. 3, a predetermined interval c is formed between the first bracket 30 and the second bracket 40 so that a portion of the connection unit 33 connected to the first bracket 30 is exposed. The gap c is formed before the side collision, but when the side collision occurs, the side sill 24 and the first bracket 30 are pushed toward the interior of the vehicle and then the gap c disappears, and thus the collision energy is transferred to the second bracket 40 and the chassis frame 10.

According to the side reinforcement structure of a vehicle in accordance with embodiments of the present disclosure having the configuration, collision performance can be improved when a side collision of the vehicle occurs.

When a collision of the vehicle occurs (refer ① to in FIG. 7), the collision energy inputted through the side sill 24 is transferred to the second bracket 40 through the first bracket 30, and the second bracket 40 absorbs the collision energy and transfers the collision energy to the chassis frame 10. When a side collision occurs, the side sill 24 and the first bracket 30 are pushed toward the interior of the vehicle (refer to ② in FIG. 7), and the first body 31 of the first bracket 30 and the second body 41 of the second bracket 40 are in contact with each other.

Figure 7:
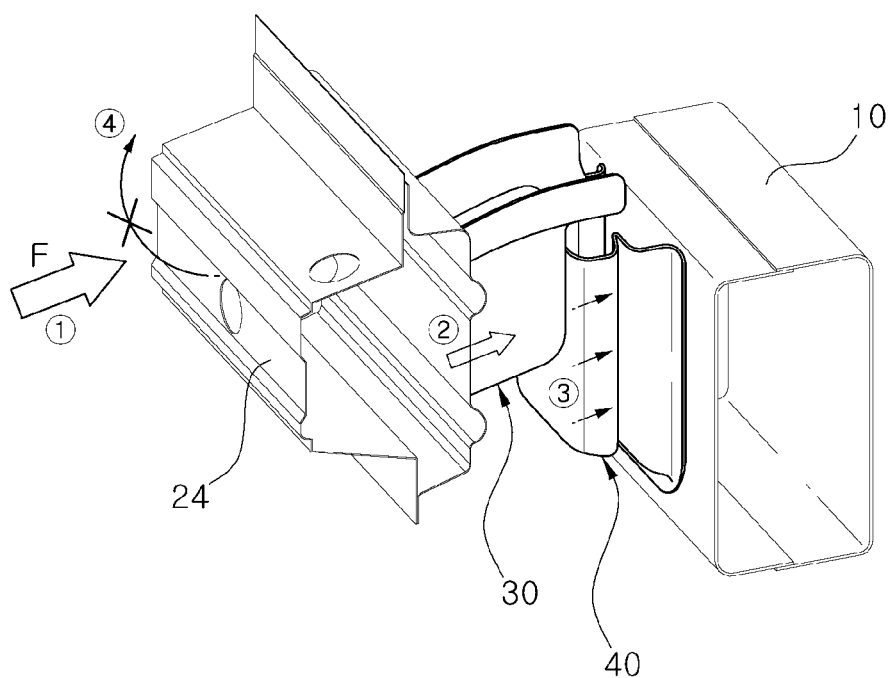
FIG. 7 is a perspective view illustrating deformation in case of a side collision with the side reinforcement structure of a vehicle according to embodiments of the present disclosure.

Thereafter, the second bracket 40 is deformed in the width direction L of the vehicle with respect to the deformation guide bead 45 by the collision energy (refer to ③ in FIG. 7).

As the second bracket 40 is deformed, the collision energy is primarily absorbed by the deformation of the second bracket 40.

The remaining collision energy is transferred to the chassis frame 10, which becomes a collision member and supports the collision energy.

Meanwhile, during a side collision, as the side sill 24 is struck, the side sill 24 attempts to rotate around a virtual axis perpendicular to the ground. However, since the end portion of the connection unit 33 is bound to the coupling groove 43 in the first bracket 30 and the second bracket 40, rotation of the side sill 24 is restrained (refer to ④ in FIG. 7). As the rotation of the side sill 24 is restrained, the amount of intrusion of the center pillar into the interior of the vehicle may be reduced during a side collision.

Accordingly, during a side collision, the interior space of the vehicle, which is a survival space, is maintained as it is, thereby reducing injury to the passenger.

What is claimed is:

1. A side reinforcement structure for a vehicle, the side reinforcement structure comprising:
a first bracket coupled to a side sill; and
a second bracket inserted into and connected to a first side of the first bracket and coupled to a chassis frame, wherein:
the first bracket comprises a connection unit connected to the second bracket,
the second bracket comprises a coupling groove into which the connection unit is inserted, and
the connection unit is restricted to the coupling groove during a side collision.

2. The side reinforcement structure of claim 1, wherein the side reinforcement structure is designed so that, following the side collision of the vehicle, the first bracket is not spaced apart from the second bracket and the side sill is not rotated with respect to a virtual axis perpendicular to a ground surface.

3. The side reinforcement structure of claim 1, wherein:
an end portion of the connection unit inserted into the coupling groove has a T-shape; and
the coupling groove has a predetermined depth from an upper end of the second bracket and is configured to constrain the end portion of the connection unit.

4. The side reinforcement structure of claim 1, wherein the first bracket further comprises:
a first body;
a first flange unit surrounding the first body and coupled to the side sill; and
the connection unit extending from the first body toward the coupling groove.

5. The side reinforcement structure of claim 4, wherein:
the first bracket is positioned at a portion where a floor lower member is connected to the side sill, and
the first flange unit is coupled to the side sill and the floor lower member.

6. The side reinforcement structure of claim 1, wherein the second bracket further comprises:
a second body;
a second flange unit surrounding the second body and coupled to the chassis frame; and
the coupling groove having a predetermined depth from an upper end of the second body on a surface facing the side sill in the second body.

7. The side reinforcement structure of claim 6, further comprising a support surface around the coupling groove in the second body and configured to support an end portion of the connection unit.

8. The side reinforcement structure of claim 7, wherein:
the second bracket further comprises a deformation guide bead in the second body, and
the deformation guide bead comprises a concave or convex shape in a longitudinal direction of the vehicle.

9. The side reinforcement structure of claim 1, wherein the first bracket and the second bracket are disposed within a predetermined length in a longitudinal direction of the vehicle from a position where a center pillar is disposed.

10. The side reinforcement structure of claim 1, wherein:
the first bracket is coupled to the side sill by a spot weld, and
the second bracket is coupled to the chassis frame by a $CO_2$ weld.

11. The side reinforcement structure of claim 1, wherein, following the side collision of the vehicle, the side sill and the first bracket are pushed toward an interior of the vehicle and the second bracket is deformed to absorb collision energy.

12. A vehicle comprising:
a vehicle body comprising:
a chassis frame;
a center pillar;
a side sill; and
a floor lower member connected to the side sill;
a first bracket coupled to the side sill; and
a second bracket inserted into and connected to a first side of the first bracket and coupled to the chassis frame, wherein:
the first bracket comprises a connection unit connected to the second bracket,
the second bracket comprises a coupling groove into which the connection unit is inserted, and
the connection unit is restricted to the coupling groove during a side collision.

13. The vehicle of claim 12, wherein:
an end portion of the connection unit inserted into the coupling groove has a T-shape; and
the coupling groove has a predetermined depth from an upper end of the second bracket and is configured to constrain the end portion of the connection unit.

14. The vehicle of claim 12, wherein the first bracket further comprises:
a first body;
a first flange unit surrounding the first body and coupled to the side sill; and
the connection unit extending from the first body toward the coupling groove.

15. The vehicle of claim 14, wherein:
the first bracket is positioned at a portion where the floor lower member is connected to the side sill, and
the first flange unit is coupled to the side sill and the floor lower member.

16. The vehicle of claim 12, wherein the second bracket further comprises:
a second body;
a second flange unit surrounding the second body and coupled to the chassis frame;
the coupling groove having a predetermined depth from an upper end of the second body on a surface facing the side sill in the second body; and
a support surface around the coupling groove in the second body and configured to support an end portion of the connection unit.

17. The vehicle of claim 16, wherein:
the second bracket further comprises a deformation guide bead in the second body, and
the deformation guide bead comprises a concave or convex shape in a longitudinal direction of the vehicle.

18. The vehicle of claim 12, wherein:
the first bracket and the second bracket are disposed within a predetermined length in a longitudinal direction of the vehicle from a position where the center pillar is disposed,
the first bracket is coupled to the side sill by a spot weld, and
the second bracket is coupled to the chassis frame by a $CO_2$ weld.

* * * * *